| United States Patent [19] | [11] 3,852,236 |
|---|---|
| Heilman | [45] Dec. 3, 1974 |

[54] HOMOGENEOUS THERMOSETTABLE COMPOSITION OF A POLYANHYDRIDE AND A POLYEPOXIDE

[75] Inventor: William J. Heilman, Allison Park, Pa.

[73] Assignee: Gulf Research & Development Company, Pittsburgh, Pa.

[22] Filed: Aug. 9, 1972

[21] Appl. No.: 278,967

Related U.S. Application Data

[63] Continuation-in-part of Ser. No. 100,418, Dec. 21, 1970, abandoned.

[52] U.S. Cl.... 260/42.18, 260/78.5 BB, 260/78.5 T, 260/836, 260/878 R, 260/886
[51] Int. Cl............................ C08f 37/18, C08f 37/00
[58] Field of Search........... 260/878 R, 836, 41 AG, 260/886, 42.18

[56] References Cited
UNITED STATES PATENTS

| | | | |
|---|---|---|---|
| 2,768,153 | 10/1956 | Shokal | 260/78.4 EP |
| 3,394,105 | 7/1968 | Christie | 260/78.4 EP |
| 3,441,543 | 4/1969 | Heilman | 117/124 E |
| 3,578,633 | 5/1971 | Rossa | 260/78.4 EP |
| 3,586,658 | 6/1971 | Wooster | 260/78.4 EP |
| 3,717,557 | 2/1973 | Peterson et al. | 204/159.15 |

*Primary Examiner*—Joseph I. Schofer
*Assistant Examiner*—A. Holler

[57] ABSTRACT

A new composition comprising a homogeneous mixture of polyanhydride, for example, the copolymer of maleic anhydride and an alpha-olefin, and a polyepoxide formed by free radical copolymerization of an olefinically unsaturated monooxirane compound such as glycidyl methacrylate and an olefin such as styrene. This composition is capable of being molded, particularly when in combination with a substrate such as fiber glass, and further cured through anhydride and epoxide groups to a solid, infusible resin.

12 Claims, No Drawings

HOMOGENEOUS THERMOSETTABLE COMPOSITION OF A POLYANHYDRIDE AND A POLYEPOXIDE

This invention is a continuation-in-part of Ser. No. 100,418, filed Dec. 21, 1970 now abandoned.

This invention relates to new compositions capable of being molded particularly when in combination with a substrate such as woven fiber glass laminate and cured to solid infusible resins and to methods of making these compositions.

I have previously discovered, as set out in U.S. Pat. No. 3,441,543, that a composition containing a polyanhydride such as the copolymer of maleic anhydride and an alpha olefin, an olefinically unsaturated monooxirane compound such as glycidyl methacrylate and an olefinically unsaturated hydrocarbon capable of polymerization by free radical means such as styrene can be copolymerized in one-step to a rigid cross-linked product by concurrent reaction of the anhydride and epoxide groups and interaction of the olefinic double bonds of the olefinically unsaturated components.

I have now unexpectedly discovered that a composition containing a polyanhydride such as the copolymer of maleic anhydride and an alpha olefin, an olefinically unsaturated monooxirane compound such as glycidyl methacrylate and an olefinically unsaturated hydrocarbon capable of polymerization by free radical means such as styrene can be polymerized in two steps in which olefinic double bonds of the olefinically unsaturated components are interreacted in the first step to produce a linear polyepoxide homogeneously intermixed with the polyanhydride and with unreacted olefinically unsaturated components, if any, without significant reaction of the anhydride and epoxy groups. In the second step, the anhydride groups of the linear polyanhydride and the epoxy groups of the polyepoxide are caused to link together at an elevated temperature to form a hard infusible resin. Unreacted olefinic double bonds from the first stage are also reacted together in the second stage.

This reaction of the olefinic double bonds in the first stage without substantial reaction of the anhydride and epoxy groups is unexpected because significant anhydride-epoxide reaction occurs at about 60° to 70° C. which is appreciably below the temperature of 80° to 100° C. at which temperature significant reaction of the olefinic double bonds occur. It was thought to be impossible to accomplish this polymerization of the olefinic double bonds without this anhydride-epoxide reaction taking place in view of the highly exothermic nature of the olefinic double bond polymerization (20–22 K.Cal./Mol.) and the relatively low temperature at which anhydride-epoxide reaction occurs.

Conventional free radical initiators to effect olefinic polymerization were ruled out because they also effect anhydride-epoxide polymerization. For example, N,N-dimethylaniline of the commercially available free radical initiator mixture of N,N-dimethylaniline and benzoyl peroxide is known to be an initiator of the anhydride epoxide reaction. Also, cobalt naphthenate of the commercially available mixture of cobalt naphthenate and methyl ethyl ketone peroxide effects anhydride-epoxide polymerization.

Furthermore, it was thought that it would be disadvantageous to polymerize the olefinic double bonds to form a polyepoxide in admixture with the polyanhydride because it was believed that a phase separation would occur in which the polymers would separate out from unreacted olefinically unsaturated monooxirane monomer and unreacted olefinically unsaturated hydrocarbon monomer. This was demonstrated by mixing together a solution of a 1:1 copolymer of maleic anhydride and 1-hexene in styrene with a 6:1 copolymer of glycidyl methacrylate and styrene also dissolved in styrene. A thick gelatinous mass quickly precipitated out of the solution.

This novel procedure is particularly useful in the preparation of relatively thin sheets of partially cured resin-fiber glass mixtures for second stage curing in matching molds to fully cured products of minimum thickness and close tolerance and of intricate shape such as auto body parts. The solution of the polyanhydride, the olefinically unsaturated monooxirane compound and the olefinically unsaturated hydrocarbon with the fiber glass is a soft, sticky mass. It is very difficult to handle and cannot be conveniently mold cured in one stage because of the handling difficulty. In preparing these relatively thin sheets of partially cured resin-fiber glass mixtures, it is convenient to initially place or form the sticky resin-fiber mixture in sheet form on a surface upon which it can be partially cured and from which the partially cured material can be readily removed for mold curing. Also, the sticky resin-fiber glass mixture can be placed or formed between two flexible sheets such as plastic film to contain the resin and to permit ease in handling until the first stage polymerization has been effected.

I have discovered that polymerization of the olefinic double bonds of the olefinically unsaturated components without significant epoxide-anhydride reaction converts the soft, sticky mixture into a flexible, non-tacky material which can be readily stripped from the containing sheets such as polyethylene and easily handled, cut, shaped and molded. Furthermore, when subjected to molding pressure and temperature, the partially polymerized fiber glass-resin mixture readily flows into intricate mold sections and conforms to the mold prior to polymerization to the hard, rigid product. This polymerized product does not stick to the mold walls and is readily ejected from the mold by conventional means.

The olefinic double bonds of the olefinically unsaturated components of the mixture are preferably polymerized under conditions which do not lead to significant epoxide-anhydride reaction. In order to accomplish this the temperature of the mixture is kept relatively low, below about 70° C. and preferably below about 50° C. However, if some epoxide-anhydride reaction can be tolerated, a temperature of about 70° C. for a limited period can be tolerated. The primary objective of the first stage, olefinic double bond polymerization is to provide a product that is not sticky or tacky and can be readily handled, shaped, cut and molded. The second stage polymerization can conveniently be a thermal cure at an elevated temperature in a heated mold.

The handling and molding characteristics of this intermediate, partially polymerized product are a function of the raw materials used, their relative proportions, the curing temperature and time, the amount of olefinic polymerization, the amount of anhydride-epoxide polymerization and the like. Thus it is seen that significant control of the properties and characteristics of the intermediate product can be effected by means of these variables.

The olefinically unsaturated components of the mixture are polymerized with the aid of any suitable free radical means which does not cause significant anhydride-epoxide reaction. These free radical means include free radical chemical initiators, ionizing radiation, ultraviolet radiation and the like. Any free radical initiator or initiation means can be used which functions at about 70° C. or below and preferably at about 50° C. or below and which does not induce significant anhydride-epoxide reaction.

An aspect of my invention is the unexpected discovery that chemical free radical initiators can be used for first stage olefinic polymerization under conditions which do not result in significant polymerization of the anhydride and epoxide groups. This is in part based on the discovery that a useful, handleable material suitable for second-stage mold curing is obtained when the olefinic double bonds are only partially polymerized. It is also in part based on the discovery that those chemical free radical initiator mixtures, in which the promoter component such as cobalt naphthenate or N,N-dimethylaniline initiates the anhydride-epoxide reaction, can be used for olefinic polymerization if the amount of the free radical initiator is restricted to an amount such that only a partial olefinic polymerization is effected. Under these circumstances it has been found that the thus produced intermediate product containing the anhydride-epoxide initiator such as cobalt naphthenate or N,N-dimethylaniline in minimum amounts cures by cross-linking of the anhydride and epoxide groups only slowly. The rate of this anhydride-epoxide cure depends in part on the amount of the chemical free radical initiator mixture, and more specifically the activator, that is used and the temperature at which the intermediate product is held or stored. Thus, the intermediate product is fully usable in second stage mold curing for up to several weeks or more after the first stage cure, depending on the amount of the initiator and the storage temperature.

Other chemical free radical initiators do not significantly effect an anhydride-epoxide reaction and therefore these are used in amounts sufficient to induce the desired degree of olefinic polymerization. For example, di(2-methylpentanoyl)peroxide causes an olefinic polymerization without significant anhydride-epoxide polymerization regardless of the amount used. Thus, the resin mixture can be substantially completely olefinically cured in the first stage if desired. The partially cured intermediate product in which the olefinic groups are more completely copolymerized is more rigid and cannot flow or conform to intricate molds to the same extent as the intermediate product containing more unpolymerized double bonds. The anhydride-epoxide reaction is very slow at room temperature when no initiator for this reaction is present, therefore, these substantially fully olefinically cured intermediate products that do not contain anhydride-epoxide initiator can be stored for long periods of time awaiting second stage curing. In order to aid moldability of these intermediate products they can be initially compounded with a suitable amount of a non-reactive or a reactive component which imparts a plasticizing quality to the intermediate product. Partial, preferably no more than minor, polymerization of the anhydride and epoxide groups in the first-stage cure undesirably increases the rigidity of the intermediate product and tends to interfere with mold curing. These plasticizing components can also partially compensate for this effect.

The chemical free radical initiators which can suitably be used in effecting the olefinic polymerization herein include those chemicals which alone or with the aid of an accelerator, also called activators or promoters, generate free radicals below 70° C., preferably below 50° C. and most preferably at about 25° C. or lower. These chemical free radical initiators include benzoyl peroxide with N,N-dimethylaniline, benzoyl peroxide with N,N-dimethyl-p-toluidine, p-chlorobenzoyl peroxide with N,N-dimethylaniline, methyl ethyl ketone peroxide with cobalt naphthenate, cyclohexanone peroxide with cobalt naphthenate, bis(-1-hydroxycyclohexyl)peroxide with cobalt naphthenate, hydroxyheptyl peroxide with cobalt naphthenate, dicyclohexyl peroxydicarbonate, dibenzyl peroxydicarbonate, di(2-methylpentanoyl)peroxide, and the like.

It has been further demonstrated that the olefinic double bonds in a mixture of the polyanhydride, an olefinically unsaturated monooxirane compound and an olefin capable of free radical polymerization are caused to interreact to form a copolymer of the olefinic compounds without significant anhydride-epoxide reaction when the resin-fiber glass mixture is subjected to ionizing radiation, comprising an electron beam, at room temperature. In this technique the dosage of ionizing radiation controls the degree of polymerization of the olefinic compounds and thereby controls the rigidity and moldability of the resulting intermediate product. Care must be exercised that the mixture is not overheated such as would result in significant epoxide-anhydride reaction.

A preferred solid polyanhydride, which is used in conjunction with the olefinically unsaturated monooxirane compound and the monoolefin capable of polymerization by free radical means, is prepared by the copolymerization of maleic anhydride or a related compound with one or more alpha-olefins. The resulting solid polyanhydride is a mixture of polymerized molecules of different chain lengths which can be represented by the general formula:

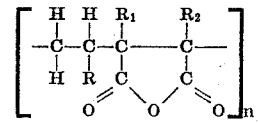

wherein $n$ is between two and about 500, preferably between about two and about 200, R is hydrogen, halogen or straight or branched chain alkyl or halogenated alkyl, having from one to about 18 carbon atoms, and $R_1$ and $R_2$ are independently selected from hydrogen, halogen, alkyl having from one to four carbon atoms and phenyl.

Another preferred solid polyanhydride is represented by the general formula:

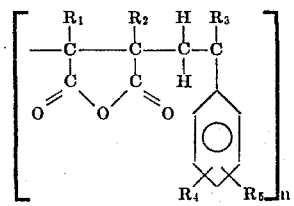

wherein $n$, $R_1$ and $R_2$ are defined above, $R_3$ is hydrogen, chlorine, bromine or methyl and $R_4$ and $R_5$ are independently selected from hydrogen, chlorine, bromine, lower alkyl having from one to four carbon atoms, methoxy and ethoxy.

Examples of olefin compounds or mixtures of olefins which are preferred to form the solid polyanhydride components of the composition of this invention include: ethylene, vinyl chloride, 1-propene, 1-butene, 1-pentene, 1-hexene, 1heptene, 1-octene, 1-nonene, 1-decene, 5-chlorohexene-1, 1-undecene, 1-dodecene, 1-tridecene, 1-tetradecene, 1octadecene, and mixtures thereof, and the like. Also included are styrene; p-bromostyrene; 2,5-dichlorostyrene; p-isopropylstyrene; 4-t.butylstyrene; 4-ethoxystyrene; 4-methoxystyrene; alphamethylstyrene; alphachlorostyrene, mixtures thereof, and the like. Other useful olefins are methyl vinyl ether, the olefins obtained by cracking hydrocarbon waxes, and the like.

Examples of compounds which are related to maleic anhydride and which can be used to form the solid polyanhydride components of the invention include: chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride, and the like.

Additional useful polyanhydrides, including constituents from which they are formed, are described and encompassed in the definition of U.S. Pat. No. 3,441,543 at column 2, line 64 to column 8, line 53, which is incorporated herein by reference as a part of this disclosure. The polyanhydride that is useful herein is broadly defined herein as well as in said patent as a solid compound containing at least two succinic anhydride groups and less than three conjugated double bonds when one of the conjugated double bonds is between the carbon atoms alpha to the carbonyl groups in a succinic anhydride group.

The solid polyanhydride is made by the copolymerization of the olefin compound and the maleic anhydride derivative. The copolymerization can be conducted in any suitable manner. One suitable copolymerization procedure involves contacting the olefinic compound with the anhydride compound in a suitable solvent in the presence of a free radical producing catalyst, such as a peroxide. The molar ratio of the olefin to anhydride in the polyanhydride is desirably between about 1:1 and about 4:1, preferably about 1.5:1 to about 2.5:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e., −80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The copolymers can be produced in any suitable solvent which at least partially dissolves both of the reaction components. Suitable solvents include, for example, n-pentane, n-hexane, n-octane, toluene, benzene, cumene, xylene, anisole, acetone, tetrahydrofuran, cyclohexane, n-propylacetate, ethylbenzene, di-n-butylether, n-amylacetate, cyclohexanone, bromobenzene, ethylbenzylether, and the like, methylene chloride, di-isopropyl ether, carbon tetrachloride, methylcyclohexane, ethyl-n-butyrate, tetrachloroethylene, methylorthotolylether, methyl ethyl ketone.

The catalyst to employ in making the polyanhydride can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobis-isobutyronitrile.

As the olefinically unsaturated monooxirane compound, we prefer to use glycidyl acrylate or glycidyl methacrylate. Other useful monooxiranes are disclosed in U.S. Pat. No. 3,441,543 at column 9, line 39 to column 11, line 75, which is incorporated herein by reference as a part of this disclosure.

The compositions also optionally but preferably comprise an olefinically unsaturated monomeric compound free of oxirane oxygen atoms and containing as its only functional group at least one olefinic double bond capable of polymerization by free radical means. Olefinically unsaturated monomeric compounds which polymerize by a free radical mechanism are well known in the art and are generally alpha-olefinically unsaturated compounds which contain substituents directly connected to the beta-carbon atom of the alpha-olefin, which substituents activate the alpha-olefin double bond for polymerization by effecting a net electron withdrawal from the olefinic double bond. Electron withdrawal groups are well known in the art and include halogen, aromatic radical, nitrile, and the like, as disclosed in U.S. Pat. No. 3,441,543 at column 12, lines 1 to 61 and column 13, line 49 to column 15, line 65 which is incorporated herein by reference as a part of the disclosure.

Examples of preferred olefinically unsaturated compounds defined above include styrene, acrylonitrile, methyl methacrylate, vinylidene chloride, acrolein, p-chloro- and bromostyrene, butadiene, vinyl acetate, vinyl bromide, vinyl chloride, and the like, and mixtures of these.

The olefinically unsaturated monooxirane compound and the olefinically unsaturated monomer free of oxirane oxygen atoms preferably must have reactivity ratios of one or less for superior results. If a reactivity ratio is greater than one, the olefinically unsaturated monomer preferentially reacts with itself. When the reactivity ratio is one, the monomer shows no preference in its reaction partner. When the reactivity ratios are less than one, each olefinically unsaturated monomer prefers to react with the other type of monomer. Thus, in the case of a mixture of glycidyl methacrylate and styrene the reactivity ratios are less than one, therefore, the resulting copolymer is a polyepoxide which comprises randomly distributed glycidyl methacrylate and styrene molecules on each chain.

In general, it is preferred that the polyanhydride, the olefinically unsaturated monooxirane compound and the olefinically unsaturated hydrocarbon form a liquid solution below 70° C. and more preferably at about room temperature in order to obtain a final, cross-linked resin which is homogeneous and grain-free. Since the polyanhydride is a solid at room temperature, it is necessary that at least one of the olefinically unsaturated compounds be liquid at room temperature in order to dissolve the other two components and it is preferred that both of the olefinically unsaturated compounds be liquid at room temperature. Additionally, the liquids must be mutually soluble and capable of solubilizing the solid polyanhydride.

As indicated, the relative proportions of the three primary constituents, that is, the polyanhydride, the olefinically unsaturated monooxirane compound and the olefinically unsaturated hydrocarbon affect the properties as well as the handling and molding characteristics of the intermediate, olefin-polymerized product. These relative proportions can also have a significant effect on the properties of this final cured, cross-linked product as well as the overall cost. In general, the molar ratio of the polyanhydride to monoepoxide compound that can be employed in the compositions varies over a fairly wide range. Since the polyanhydride is a mixture of molecules of different sizes and numbers of anhydride groups, the anhydride to epoxide equivalent ratio, i.e., the A/E ratio, is used to express the relative proportions of anhydride and epoxide groups present in the liquid resin composition. The A/E ratio of one mol of maleic anhydride and one mol of glycidyl methacrylate is 1.0. In the compositions described herein the A/E ratio can suitably be between about 0.1:1 and 5:1, but is preferably between 0.3:1 and 2:1 and more preferably between about 0.5:1 and 1.5:1.

The amount of the olefinically unsaturated monomer without epoxide functionally can vary between 0 and about 4 parts by weight per part of the olefinically unsaturated monooxirane compound and preferably between about 0.25 and about 2 parts per part of the monooxirane compound. These figures relate solely to the free olefinically unsaturated monomer used in forming the initial homogeneous resin solution and do not relate to the olefinically unsaturated material from which the polyanhydride is formed by copolymerization. The maximum amount of any particular unsaturated monomer to employ will depend upon its compatibility in the final product, that is, the intersolubility of the components. Thus, it has been found that the lower the A/E ratio when using glycidyl methacrylate, the greater the amount of styrene that can be used. It has further been found that the intersolubility is improved with methyl methacrylate. It has been discovered also that a minor amount of methyl methacrylate in styrene exhibits a dramatic reduction in the viscosity of the mixture, much greater than the expected solvent effect. This not only improves the intersolubility of the components but permits easy mixing with an inert filler and ready wetting of the fiber glass. Use of a minor amount of methyl methacrylate in a styrene-glycidyl methacrylate-polyanhydride mixture is therefore a preferred modification for many applications. In this methyl methacrylate-styrene combination the methyl methacrylate can suitably be from about 1 percent to about 80 percent of this two-component mixture.

As pointed out, polymerization of the double bond is highly exothermic. In view of this, care must be exercised in order that the material does not heat high enough in the first stage polymerization to cause a significant anhydride-epoxide cross-linking reaction such that the material cannot be easily handled or molded. When the fiber glass-resin mixture has been laid down in thin sheets, the exothermic heat of reaction is more readily dissipated than when thick sheets are used. It is because of this exothermic heat of reaction that it is preferred to initiate the first stage reaction with the materials at about room temperature or lower. Furthermore, the rate of the first stage reaction and therefore the heat buildup can be partially controlled by control of the free radical initiation. Chemical free radical initiators generate free radicals at different rates and therefore polymerization can be controlled by selection of the chemical initiator and by varying the amount of the chemical initiator. If ionizing radiation is used, a reduction in the intensity of the radiation source will reduce the rate of heat buildup in the material.

As indicated, the nature of the chemical free radical initiator as well as the relative amounts used will affect the first stage polymerization. Generally I have found that from about 0.01 to about 5 parts by weight per 100 parts of the olefinic constituents will effect polymerization and preferably about 1 to 3 parts are used. When the chemical free radical initiator is a mixture such as a peroxide and a promoter, for example, methyl ethyl ketone peroxide and cobalt naphthenate as a promoter, it has been found to be preferable to use the peroxide and the promoter at their optimum proportions for producing free radicals. That is, it is preferable not to vary the relative proportion of the peroxide and its promoter in order to accomplish a change in the first stage polymerization.

If the product of the first stage polymerization is used soon after it is made, such as within 1 to several days, it can be temporarily stored for use without problem. However, if only partial copolymerization of the olefinic components is carried out in the first stage, substantial polymerization of the unreacted olefin compounds can take place on prolonged storage such as to affect the subsequent ability to flow and conform to the mold. Thus when the olefinic constituents are substantially completely polymerized in the first stage or prolonged storage is contemplated, it may be desirable to incorporate in the initial mixture a plasticizer or a plasticizing monomer which possesses the ability to enhance the flow characterisitics during molding. Such plasticizing components include epoxidized vegetable oils such as epoxidized soy bean oil, di-2-ethylhexyl phthalate, dioctyl phthalate, dihexyl phthalate, diisooctyl phthalate, polyethylene glycols such as those having a molecular weight between 600 and 1,000, Nadic methyl anhydride (a mixture of methyl bicyclo(-

2.2.1)-heptane-2,3-dicarboxylic isomers), phenyl glycidyl ether, alkyl glycidyl ethers such as octyl and decyl glycidyl ethers and the like. Refrigeration of the first stage product will reduce polymerization during storage. Generally when the first stage polymerization is carried out as part of an integrated operation, the molding operation is carried out relatively soon in an adjacent unit. In this instance holding time presents no problem. However, when the first stage product is distributed in the channels of commerce, stability over periods of weeks or months may be required. In this instance the use of a plasticizer or a plasticizing monomer can be useful.

The second stage curing accomplishes a cross-linking of the polyanhydride chains and the polyepoxide chains through the anhydride and epoxide functions. This curing is obtained at elevated temperatures. The curing temperature has been found to be critical in order to obtain finally cured resins which have suitable physical properties. Curing temperatures are therefore suitably between about 80° C. and about 200° C., preferably between about 100° C. and about 150° C. For quick cures it is most preferred to use a curing temperature toward the upper end of the range. The curing time generally is between 30 seconds and 8 hours depending on the curing temperature, the resin composition and the like. Curing in stages, that is, at different temperatures, can be utilized, however, for simplicity and convenience one stage curing is preferred. Although pressure is not required for the second stage curing, it is usually involved when the intermediate product is mold cured and fortuitously the physical properties of the finally cured product are improved by curing under pressure. Pressures as high as 5,000 p.s.i. and higher are usable herein.

As previously indicated, the resin composition is preferably formed in sheets using a fiber glass binder. The fiber glass can be in the form of a woven glass fabric or randomly distributed glass fibers. When chopped glass fibers are used they can suitably range from ⅛ inch to 2 inches in length and preferably from about ¼ inch to about 1 inch in length. Other fibrous material can be used as the core or binder in the form of randomly distributed fibers, fluff, paper, woven fabric, etc. This can be made from natural materials such as cellulose, including sisal, hemp, cotton and linen, asbestos, etc., or a synthetic such as nylon, polyester, polyolefin, and the like.

Fiber glass in various forms is well known and commercially available for resin-fiber glass compositions. A lubricant or finish is generally applied to the fiber glass filaments by the manufacturer. It is preferred that the fiber glass filaments comprising the fiber glass material used as the core or binder have a coating or finish which is reactive under the curing conditions with at least one of the resin forming components. The silane finishes are preferred because they are chemically bonded to the glass filaments and have free reactive groups available for reaction with the resin.

The resin compositions can contain constituents in addition to the monomers and core material such as pigments or dyes for coloring the finished product, plasticizers as mentioned, fillers and the like. The fillers provide the desirable function of reducing the cost of the final product without significantly reducing the physical properties. Suitable filler material includes powdered calcium carbonate, clay, sands, powdered metals such as aluminum and iron, metal oxides such as iron oxide, alumina, etc., powdered silica, wood flour, walnut shell flour and the like. The filler is preferably inert in the composition, that is, it should not react with any of the reactants or catalyze a reaction involving the reactants. Other additives which can be used are a suitable mold release agent or a material such as poly(methyl methacrylate) or finely ground polyethylene to impart a low profile, that is, a smooth surface, to the finally cured product.

The following examples are set out to illustrate the novel process and compositions of the invention and to provide a better understanding of their details and advantages.

I have found that a polyanhydride prepared from maleic anhydride and an olefin such as hexene-1 or styrene is highly suitable herein. I have also found glycidyl methacrylate to be very suitable as the unsaturated monooxirane compound and styrene as the unsaturated hydrocarbon. The polyanhydride is a solid at room temperature and is soluble in the glycidyl methacrylate and a glycidyl methacrylate-styrene solution but not styrene alone. Therefore, I find it convenient to mix the polyanhydride in a glycidyl methacrylate-styrene solution. Using some methyl methacrylate in the glycidyl methacrylate-styrene solution not only increases the solubility of the polyanhydride in the solution but additionally significantly decreases the viscosity of the resulting solution and makes it much more susceptible to wetting and mixing with the fiber glass and filler material, if used.

The 1-hexene-maleic anhydride copolymer used in the following examples was prepared by reacting 1-hexene and maleic anhydride in a molar ratio of about 2:1 in the liquid phase. The reaction was carried out in the presence of a mutual solvent at a temperature between 60° and 100° C. using as a catalyst between 2 and 3 weight percent benzoyl peroxide based on the maleic anhydride. The copolymer was separated from the solvent and any residual catalyst, and then dried. Infrared and nuclear magnetic resonance analysis showed the 1-hexene and maleic anhydride to have combined in a 1:1 molar ratio.

EXAMPLE 1

A liquid resin solution was prepared by adding 388 grams of the 1-hexene-maleic anhydride copolymer described above to 886 grams of styrene and 200 grams of glycidyl methacrylate with stirring. The agitation was sufficient to wet the particles of the polyanhydride and disperse them in the solvent solution to prevent any agglomeration and was continued until complete solution was obtained. The resulting solution contained 60 weight percent styrene and had an A/E ratio of 1.5. To reduce the viscosity, 164 grams of methyl methacrylate were added and 0.1 percent of 2,6-ditertiary butyl-p-cresol was added as a polymerization inhibitor to permit storage of this liquid resin solution.

To 100 parts of this liquid resin were added two parts per hundred of methyl ethyl ketone peroxide as a 60 percent solution in dimethyl phthalate with stirring. Next 0.4 part per hundred of cobalt naphthenate was added and then 100 parts per hundred of powdered calcium carbonate were stirred in. The mixture was stirred into a smooth paste after 3 parts per hundred of zinc stearate were added as a mold lubricant. This mixture was then added to a plastic bag together with 100 grams of ¼ inch glass fibers and the mixture was thoroughly kneaded. The fiber glass-resin mixture was then formed into a 3/16 inch sheet between two polyethylene films and allowed to polymerize at room temperature for 4 hours and 20 minutes. The sheet was pliable, firm and non-tacky. It separated easily from the polyethylene films. The sheet was cured between two aluminum sheets for 10 minutes at 280° F. and post-cured for 24 hours at 100° C. The resulting sheet had a Barcol 935 hardness of 96.

EXAMPLE 2

The same formulation and procedure as used in Example 1 were used except that 1 part per hundred of methyl ethyl ketone peroxide and 0.2 part per hundred of cobalt naphthenate were added. Partial polymerization to a flexible, non-tacky intermediate product occurred in 4 hours and 15 minutes at room temperature. The finally cured sheet had a Barcol hardness of 95.

EXAMPLE 3

The same formulation as used in Example 1 was used except that 0.5 part per hundred of methyl ethyl ketone peroxide and 0.1 part per hundred of cobalt naphthenate were added. First stage cure occurred after 5 and ¼ hours at room temperature and 16 hours at 8° C. to a firm, pliable, non-tacky material. After second-stage curing as in Example 1, the final product had a Barcol hardness of 93.

EXAMPLE 4

The same formulation as used in Example 1 was used. The first stage cure was at 70° C. for 5 minutes and at room temperature for 3 hours and 15 minutes. The intermediate product was non-tacky, flexible and easily handled. A portion was second-stage cured as in Example 1 to a final product having a Barcol hardness of 96. The other portion was set aside at room temperature for 24 hours. It remained flexible and moldable. After standing a further 24 hours, it became more rigid and was less easily moldable.

EXAMPLE 5

The liquid resin formulation as used in Example 1 was changed to one having an A/E ratio of 0.5 and a styrene content of 33 percent by dissolving together 495 grams of styrene, 600 grams of glycidyl methacrylate and 387 grams of the 1-hexene-maleic anhydride copolymer without the addition of any methyl methacrylate. The remainder of the formulation was the same as set out in Example 1. After standing at 8° C. for 19 hours and at 75° F. for 9 hours, the intermediate product was non-tacky and somewhat soft. The final cure according to the procedure of Example 1 resulted in a sheet having a Barcol hardness of 94.

EXAMPLE 6

The formulation of Example 1 was modified by using one part per hundred of ditertiary butyl diperoxy oxalate instead of the methyl ethyl ketone peroxide and cobalt naphthenate. First-stage cure at 55° C. for 5 minutes and at room temperature for 2 hours and 50 minutes resulted in a partially polymerized intermediate product that was flexible, non-tacky and readily moldable. It was cured according to the procedure of Example 1 to rigid material having a Barcol hardness of 93.

EXAMPLE 7

The formulation of Example 1 was modified only by substituting one part per hundred of cyclohexyl hydroperoxide for the methyl ethyl ketone peroxide and the cobalt naphthenate. First-stage cure for 5 minutes at 70° C. and for three hours and 50 minutes at room temperature produced a pliable, non-tacky, easily molded intermediate product. Final cure as accomplished in Example 1 resulted in a cured sheet having a Barcol hardness of 94.

EXAMPLE 8

The formulation of Example 1 was changed by using one part per hundred of benzoyl peroxide and 0.1 part per hundred of N,N-dimethyl aniline in place of the methyl ethyl ketone peroxide and cobalt naphthenate. The composition first-stage cured at room temperature for 4 hours and 15 minutes to a flexible, non-tacky, readily moldable material. Final cure according to the procedure of Example 1 produced a rigid sheet having a Barcol hardness of 95.

EXAMPLE 9

The formulation of Example 8 was modified by replacing the N,N-dimethyl aniline with 0.1 part per hundred of N,N-dimethyl-p-toluidine. The mixture cured at room temperature for 4 hours and 45 minutes to a non-tacky, flexible easily molded material. Final cure as described in Example 1 resulted in a product having a Barcol hardness of 94.

The fiber glass is added to give strength to the finally cured product, the more glass the stronger it is provided that there is enough resin to properly wet the glass. Also the product is increased in strength by the use of longer glass fibers and glass cloth. There can be from 0 weight percent of glass up to about 90 percent glass (with no filler) with a preferred range of glass content of about 15 to 50 percent. The filler can be present in an amount of 0 percent to about 60 percent or more and preferably about 25 to 50 percent with fiber glass present. Since there is a maximum as to the total solids, that is, fiber glass plus filler, that can be incorporated into the product, the filler content and the fiber glass content must be balanced for desired properties especially with a formulation using maximum solids. It is generally preferred to use a formulation fully loaded with solids.

Any suitable mold release agent can be used as required. An internal mold release agent such as zinc stearate can be incorporated into the resin formulation in suitable amounts. Or alternatively a suitable mold release agent can be used on the molds. Many suitable internal and external mold release formulations are commercially available. I have experienced no serious difficulty in the resin formulations sticking to the molds in the second-stage molding.

It is to be understood that the above disclosure is by way of specific example and that numerous modifications and variations are available to those of ordinary skill in the art without departing from the true spirit and scope of my invention.

I claim:

1. A method of preparing a handleable, thermosettable, moldable composition which comprises the steps forming a liquid solution consisting essentially of a polyanhydride represented by the general formula

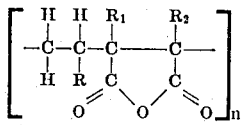

or

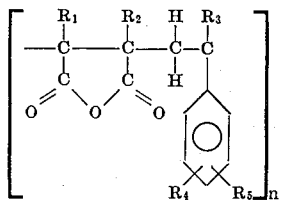

wherein $n$ is between 2 and about 500, R is hydrogen, halogen or a straight chain alkyl or halogenated alkyl group having from 1 to 18 carbon atoms, $R_1$ and $R_2$ are independently selected from hydrogen, halogen, alkyl having from one to four carbon atoms and phenyl, $R_3$ is hydrogen, chlorine, bromine or methyl and $R_4$ and $R_5$ are on an aromatic nucleus and are independently selected from hydrogen, chlorine, bromine, lower alkyl having from one to four carbon atoms, methoxy and ethoxy;
an olefinically unsaturated monooxirane compound containing as its only functional groups a single oxirane oxygen atom and an olefinic double bond capable of being polymerized by free radical means; and optionally
an olefinically unsaturated monomer free of oxirane oxygen atoms and containing as its only functional groups at least one olefinic double bond capable of polymerization by free radical means; and
polymerizing at least a portion of said olefinic double bonds of said olefinically unsaturated monooxirane compound and said olefinically unsaturated monomer by using a chemical free radical initiator at a temperature up to about 70° C. without substantial polymerization of the anhydride groups and the epoxide groups present in the mixture whereby a handleable, thermosettable, moldable composition comprising a homogeneous mixture of polyanhydride molecules, polyepoxide molecules and any unreacted olefinically unsaturated monooxirane compound and olefinically unsaturated monomer is obtained.

2. A method in accordance with claim 1 in which the chemical free radical initiator is an organic peroxide.

3. A method in accordance with claim 1 in which a fiber glass substrate is incorporated into said liquid solution.

4. A method in accordance with claim 1 in which the polyanhydride is represented by the general formula:

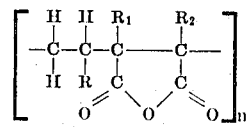

wherein $n$ is between 2 and about 500, R is hydrogen, halogen or a straight chain alkyl or halogenated alkyl group having from one to 18 carbon atoms, and $R_1$ and $R_2$ are independently selected from hydrogen, halogen, alkyl having from one to four carbon atoms and phenyl.

5. A method in accordance with claim 4 in which $R_1$ and $R_2$ are hydrogen, the olefinically unsaturated monooxirane compound is glycidyl acrylate or glycidyl methacrylate and the olefinically unsaturated monomer is styrene.

6. A method in accordance with claim 1 in which the polyanhydride is represented by the general formula:

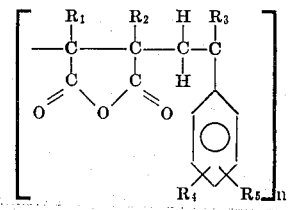

wherein $n$ is between 2 and about 500, $R_1$ and $R_2$ are independently selected from hydrogen, halogen, alkyl having from one to four carbon atoms and phenyl, $R_3$ is hydrogen, chlorine, bromine or methyl and $R_4$ and $R_5$ are on an aromatic nucleus and are independently selected from hydrogen, chlorine, bromine, lower alkyl having from one to four carbon atoms, methoxy and ethoxy.

7. A method in accordance with claim 6 in which $R_1$, $R_2$, $R_3$, $R_4$, and $R_5$ are hydrogen, the olefinically unsaturated monooxirane compound is glycidyl acrylate or glycidyl methacrylate and the olefinically unsaturated monomer is styrene.

8. A method in accordance with claim 1 at a temperature up to about 50° C.

9. A method in accordance with claim 1 in which a plasticizer is present in said solution.

10. A method in accordance with claim 1 in which the anhydride to epoxide equivalent ratio is between about 0.1:1 and about 5:1 and the amount of olefinically unsaturated monomer is between about 0 and about 4 parts by weight per part of the olefinically unsaturated monooxirane compound.

11. A method in accordance with claim 10 in which the anhydride to epoxide equivalent ratio is between about 0.5:1 and about 1.5:1 and the amount of olefinically unsaturated monomer is between about 0.25 and about 2 parts by weight per part of the olefinically unsaturated monooxirane compound.

12. A method in accordance with claim 3 in which the handleable, thermosettable, moldable composition is formed in a relatively thin sheet.

* * * * *